United States Patent [19]

Bastedo et al.

[11] Patent Number: 5,310,314
[45] Date of Patent: May 10, 1994

[54] DIRECTIONAL CONTROL SYSTEM FOR ROTARY WING AIRCRAFT

[75] Inventors: Walter Bastedo, Hendersonville, N.C.; Alex Pappas, Greenlawn, N.Y.; Martin L. Stevens, Brielle, N.J.

[73] Assignee: Gyrodyne Company of America, Inc., St. James, N.Y.

[21] Appl. No.: 37,354

[22] Filed: Mar. 26, 1993

[51] Int. Cl.$^5$ .............................................. B64C 27/46
[52] U.S. Cl. ........................................ 416/88; 416/87
[58] Field of Search .................... 416/87, 88, 89, 101, 416/132 R, DIG. 7, 23

[56] References Cited

U.S. PATENT DOCUMENTS

| | | | |
|---|---|---|---|
| 2,835,331 | 5/1958 | Ryan et al. | 416/129 |
| 3,814,351 | 6/1974 | Bielawa | 416/88 |
| 4,710,101 | 12/1987 | Jamieson | 416/87 |
| 5,096,378 | 3/1992 | Jamieson | 416/88 |

*Primary Examiner*—Edward K. Look
*Assistant Examiner*—James A. Larson
*Attorney, Agent, or Firm*—Robert E. Burns; Emmanuel J. Lobato

[57] ABSTRACT

A tip brake unit for installation in tip portions of rotor blades of rotary wing aircraft having a plurality of load-carrying rotors has a frame of a size and shape for installation in a tip portion of a rotor blade. An elongate tip brake member of channel cross sectional shape with a closed outer end is supported and guided by rollers on the frame for movement longitudinally between an inner position in which a closed outer end of the tip brake member is flush with the tip of the rotor blade and an outer position in which the tip brake member projects beyond the tip of the blade. The open side of the channel shaped tip brake member faces forwardly with respect to the direction of movement of the tip portion of the rotor blade in which the tip brake unit is installed. The tip brake member is moved between inner and outer positions by a first pinion engaging a first rack on the tip brake member, an operating member having a second rack engaging a smaller second pinion coaxially rotatable with the first pinion, a first bell crank having a longer arm connecting with the operating member and a shorter arm connected with a longer arm of a second bell crank having a shorter arm connected through a lost motion device with a tip brake operating system of the aircraft.

13 Claims, 3 Drawing Sheets

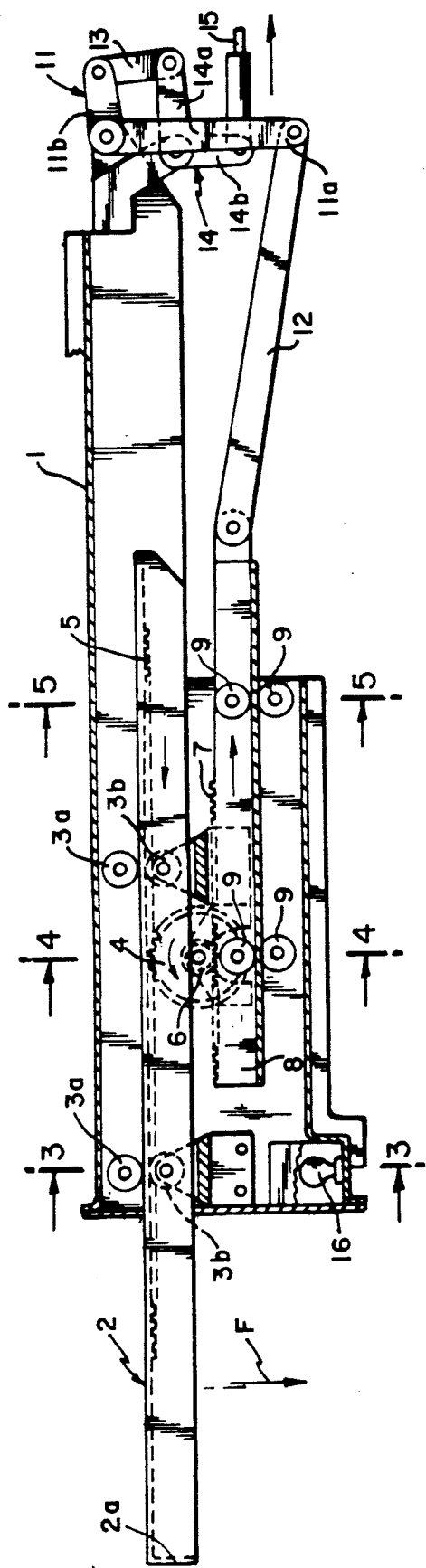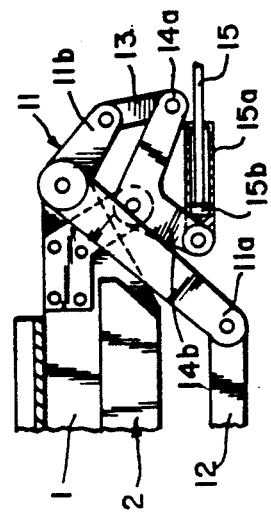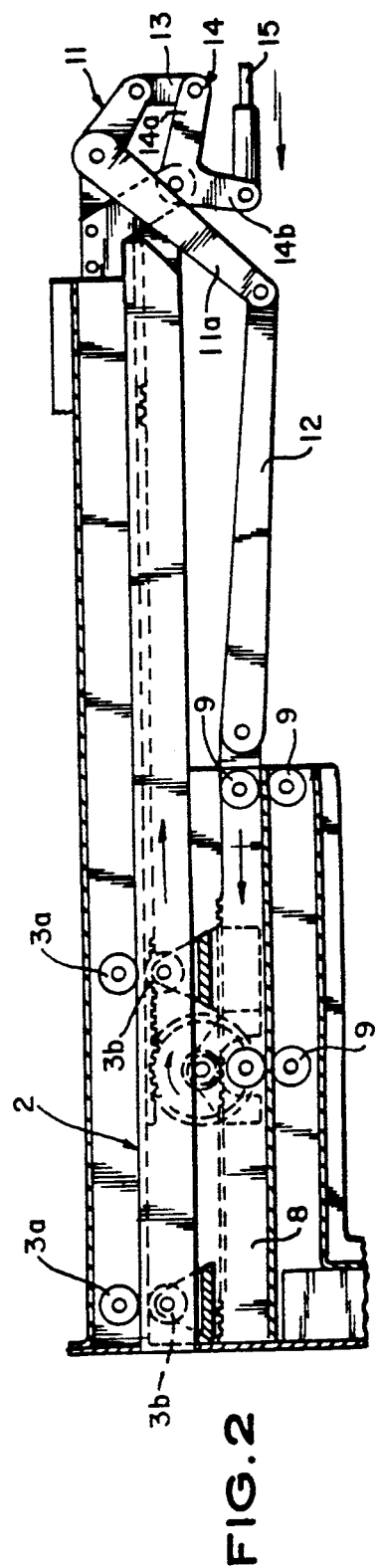
FIG. 1
FIG. 2A
FIG. 2

DIRECTIONAL CONTROL SYSTEM FOR ROTARY WING AIRCRAFT

FIELD OF THE INVENTION

The present invention relates to a directional control system for rotary wing aircraft having two load-carrying rotors turning in opposite directions. The invention is particularly applicable to helicopters having coaxial rotors one above the other, tandem rotors disposed one ahead of the other, and rotors arranged side by side. While, for convenience of description, reference is herein made to rotary wing aircraft having "two" rotors, it will be understood the the invention is also applicable to aircraft having more than two rotors, the term "two" being used in the sense of "at least two."

BACKGROUND OF THE INVENTION

As a load-carrying rotor of a helicopter turns in the air, the blades or wings of the rotor provide lift and also develop drag. The drag of the rotor reacts through the rotor shaft and driving mechanism to produce torque tending to turn the fuselage of the helicopter in a direction opposite to that in which the rotor is turning. In a helicopter having a single load-carrying rotor, the reaction torque is customarily counterbalanced by a small rotor having an approximately horizontal axis, for example a tail rotor. In a helicopter having contra-rotating load-carrying rotors, the reaction torque of one rotor is balanced by that of the other so that no tail rotor is necessary. Directional control of such helicopter can be obtained by causing the reaction torque of one rotor to be greater than that of another so that there is a resultant torque differential tending to turn the helicopter fuselage.

It has previously been proposed to provide directional control for a helicopter with contra-rotating load-carrying rotors by varying the pitch of the rotor blades. If the pitch of the blades of one rotor is increased and the pitch of the blades of the other rotor is decreased by the same amount, the drag of the first rotor becomes greater while that of the second rotor is diminished, but the total lift of the two rotors remains essentially the same. This produces a torque differential that reacts through the rotor transmission and appears as a torque tending to turn the fuselage of the aircraft about the approximately vertical axis of the rotor shaft. It is thus possible, by differential control of the rotor blade pitch, to control the directional heading of a helicopter.

The use of differential collective pitch to control the directional heading of a helicopter has been found satisfactory in "power on" flight, i.e., when the rotors are driven by the engine. However, it has been found experimentally that in "power off" (autorotative) or "partial power" flight, differential collective pitch control is not satisfactory. In moderate to high speed autorotative forward flight, the differential collective pitch control has a tendency to reverse in effectiveness, i.e., application of right rudder by the pilot gives rise to left yaw, and vice versa. In zero speed or low speed autorotative flight with such a control system, the directional control becomes very "soft," and, in the case of coaxial rotors, the helicopter has a strong tendency to turn in the direction of rotation of the lower rotor. These effects present a serious problem in maneuvering the helicopter and give rise to an accident hazard.

Through Ryan et al. U.S. Pat. No. 2,835,331, it is known to obtain directional control of a rotary wing aircraft having contrarotating load-carrying rotors by means of tip brakes on the rotor blades. The term "tip brake" is used to designate an aerodynamic brake device disposed at or near the tip of the rotor blade and operable to increase the drag of the blade, preferably without materially affecting its lift. The tip brakes are operated by a control system actuated by a pilot-controlled steering member which may, for example, be in the form of rudder pedals, a rudder bar, or a steering wheel. The operation of the tip brakes is coordinated by the control system so that the tip brakes of one or another of the rotors are actuated selectively.

SUMMARY OF THE INVENTION

It is an object of the present invention to provide, in rotary wing aircraft having a plurality of load-carrying rotors, an improved tip brake unit for installation in tip portions of the rotor blades. In accordance with the invention, an elongate tip brake member of channel cross sectional shape is supported and guided by rollers for movement longitudinally in a frame of a size and shape for installation in a tip portion of a rotor blade. The channel shaped tip brake member opens forwardly with respect to the direction of travel of the tip portion of the blade in which the tip brake unit is installed and has a closed outer end. This shape of the tip brake member has been found experimentally to increase its aerodynamic drag producing capability considerably as compared with a flat plate or a cylindrical rod of equal frontal area. When the tip brake member is in its inner or retracted position, the closed outer end of the tip brake member is flush with the tip portion of the rotor blade and thus eliminates any tip brake drag when the directional control is in the zero-deflection or neutral-pedal position and so eliminates any power loss. Moreover, the tip brakes in accordance with the invention provide essentially linear directional control with respect to rudder pedal deflection.

The tip brake member is movable between an inner position in which the closed outer end of the tip brake member is flush with the tip of the rotor blade and a variable outer position in which the tip brake member extends beyond the tip of the rotor blade by a system of gears and levers which amplifies the movement obtained from the tip brake control system of the aircraft.

In accordance with the invention, a tip brake unit for installation in a tip portion of a rotor blade of a rotary wing aircraft comprises a frame of a size and shape suitable for installation in a tip portion of a rotor blade. An elongate tip brake member of channel cross sectional shape with an end closure closing an outer end of the tip brake member is supported and guided in the frame by rollers for movement in a longitudinal direction between an inner position in which the closed outer end of the tip brake member is flush with the tip of the rotor blade and an outer position in which the tip brake member extends a variable distance outwardly beyond the tip of the rotor blade. Operating mechanism for moving the tip brake member between inner and outer positions comprises a pair of coaxial pinions rotatable together of which a larger pinion engages gear teeth in the form of a rack on the tip brake member while a smaller pinion is engaged by a rack on an operating member which is movable longitudinally in the frame. This rack and pinion mechanism provides motion amplification, by reason of the different sizes of the pinions, so that longitudinal movement of the tip brake member is greater than that of the operating member. Moreover, the operating member is connected with the directional control system of the aircraft by a linkage mechanism which provides further motion amplification.

By reason of the motion amplification provided by the rack and pinion gears and by the linkage mechanism, adequate movement of the tip brake members can be effected by only a small movement provided by the aircraft directional control system. Moreover, centrifugal force acting on the operating member, which moves in a direction opposite to the direction of movement of the tip brake member, counterbalances centrifugal force acting on the tip brake member by reason of rotation of the rotor.

BRIEF DESCRIPTION OF DRAWINGS

The invention will be more fully understood from the following description of a preferred embodiment shown by way of example in the accompanying drawings in which:

FIG. 1 is a plan view of a tip brake unit in accordance with the present invention with the tip brake member shown in extended position;

FIG. 2 is a plan view in which the tip brake member is shown in retracted position;

FIG. 2A is an enlarged right-hand end portion of FIG. 2;

DESCRIPTION OF PREFERRED EMBODIMENT

Figure 3:
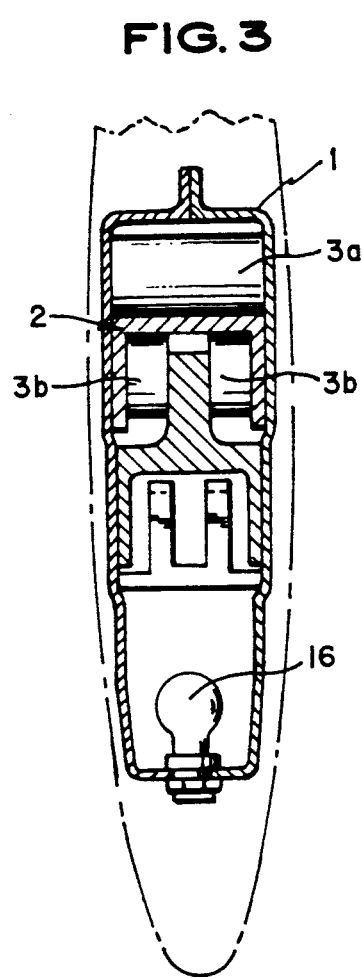
FIGS. 3, 4, and 5 are cross sectional views taken respectively on lines 3—3, 4—4, and 5—5 in FIG. 1, with an outline of a tip portion of the rotor blade shown in phantom.

As shown by way of example in the drawings, a tip brake unit in accordance with the present invention comprises a frame 1 of a size and shape suitable for installation in a tip portion of a rotor blade. A tip brake member or probe 2 of channel cross sectional shape with a closed outer end 2a is supported and guided for longitudinal movement by rollers 3a and 3b which are rotatably mounted on the frame and engage respectively outer and inner surfaces of the tip brake member 2.

The tip brake member 2 is movable longitudinally, between an inner or retracted position in which the closed outer end of the channel shaped tip brake member is flush with the tip of the rotor blade and an outer or active position in which the tip brake extends a variable distance outwardly beyond the tip of the rotor blade. The open side of the channel shaped tip brake member opens forwardly with respect to the direction of movement of the tip portion of the rotor blade as indicated by the arrow F in FIG. 1. It has been found experimentally that the forwardly opening channel shaped tip brake member, with a closed outer end, has greater drag producing capability than a flat plate or cylindrical rod of equal frontal area. Moreover, the drag produced is proportional to the distance the tip brake member extends beyond the tip of the rotor blade, thereby providing essential linear control with respect to rudder pedal movement.

The tip brake member 2 is moved between its inner or retracted position and a variable extended position by means of a pinion 4 which is rotatably mounted on the frame and engages gear teeth in the form of a rack 5 provided on an inner surface of the tip brake member 2. A coaxial second pinion 6, which is integral with or fixedly connected with the pinion 4, is engaged by a rack 7 on an operating member 8 which is supported and guided for movement in a longitudinal direction by pairs of rollers 9 rotatably mounted on the frame 1.

It will be seen that by reason of engagement of the rack 7 with the pinion 6, movement of the operating member toward the right as viewed in FIG. 1, produces rotary movement of the pinion 6 and the coupled pinion 4 in a counterclockwise direction which, in turn, by reason of engagement of the rack 4 with the pinion 5, produces a longitudinal movement of the tip brake member 2 in a direction toward the left. Moreover, it will be seen that by reason of pinion 4 being larger than pinion 6, the amplitude of longitudinal movement of the tip brake member 2 will be greater than that of the operating member 8.

It will further be noted that the tip brake member 2 and the operating member 8 move in opposite directions. Hence, centrifugal force acting on the tip brake member 2, by reason of rotation of the rotor, will be counterbalanced by the centrifugal force acting on the operating member 8.

Figure 4:
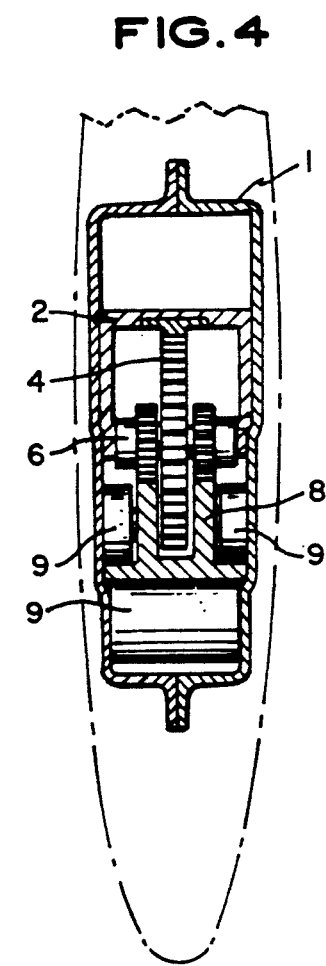
Figure 5:
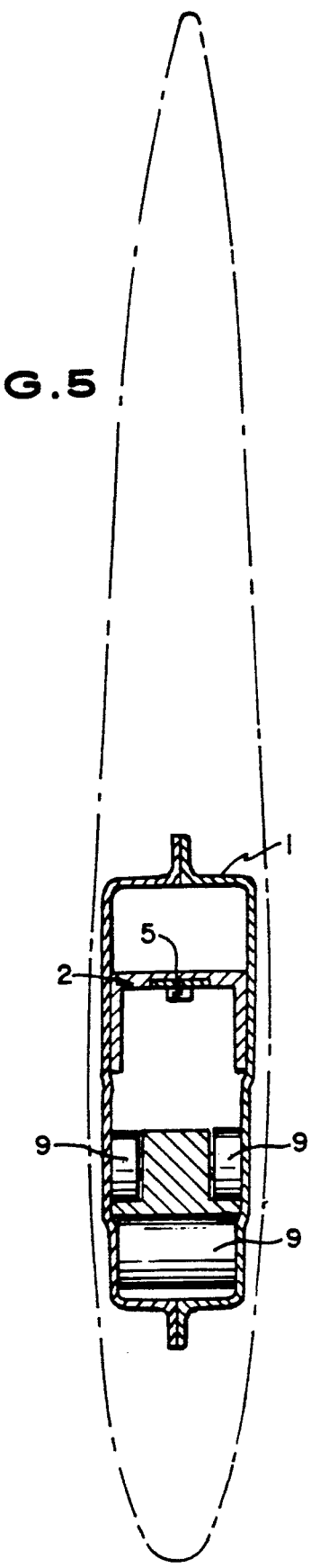
Figure 6:
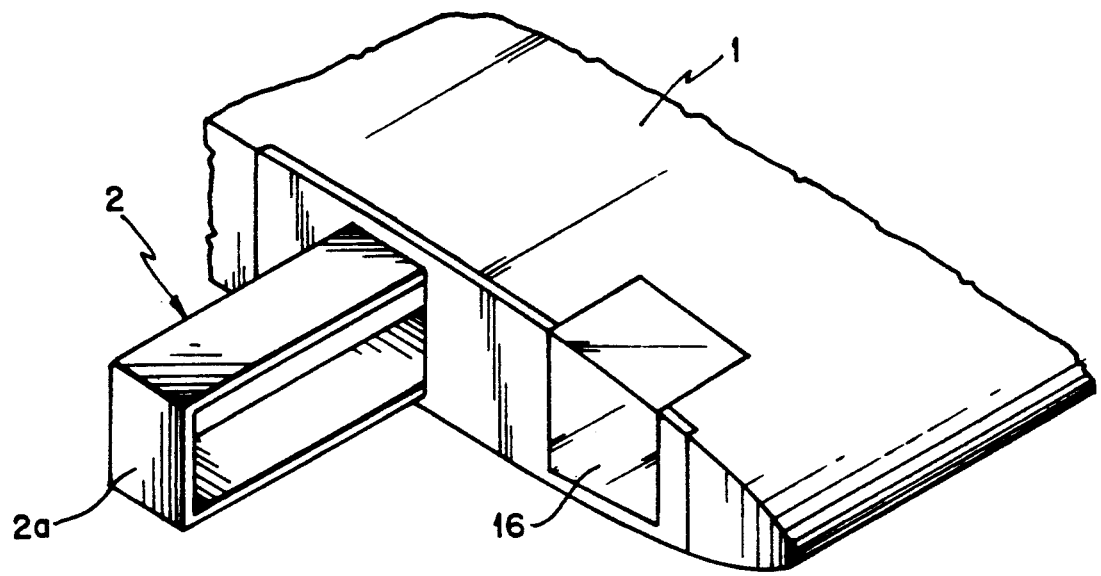
FIG. 6 is a fragmentary perspective view of a tip portion of a rotor blade showing the tip brake member in extended position.
Figure 7:
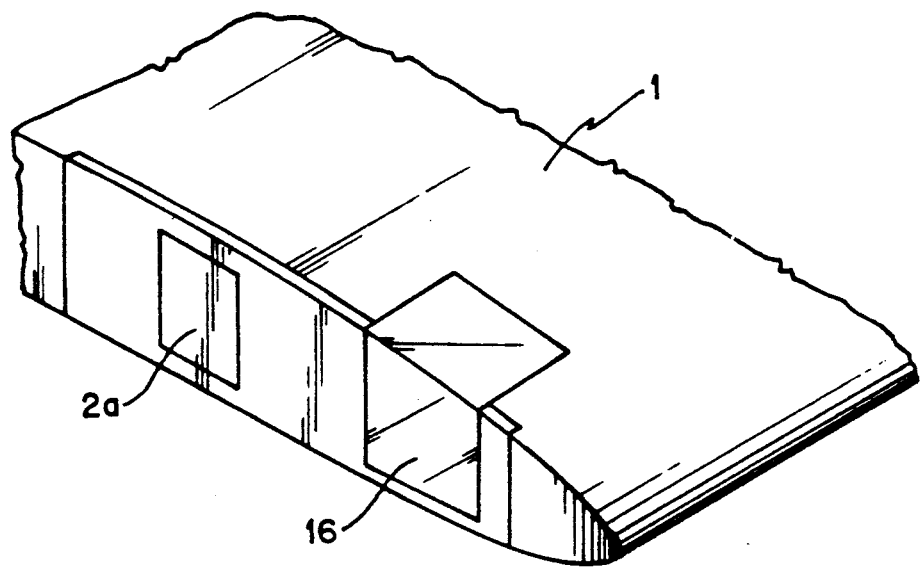
FIG. 7 is a fragmentary perspective view of a tip portion of a rotor blade showing the tip brake member retracted.

As will be seen from FIGS. 3, 4, and 5, the rack 5 is provided on a central portion only of an inner surface of the channel-shaped tip brake member 2 while the supporting and guiding rollers 3b engage plane portions of the inner wall of the tip brake member on opposite sides of the rack 5. Thus, the rack 5 is not engaged by the supporting and guiding rollers 3b.

The operating member 8 is movable in a longitudinal direction by means of a linkage mechanism which connects it with a conventional control system actuated by a conventional pilot-controlled steering member which may, for example, be in the form of rudder pedals, a rudder bar, or a steering wheel. As shown by way of example in the drawings, the linkage mechanism comprises a bell crank 11 which is pivotally mounted on the frame 1 and has a longer arm 11a pivotally connected by a link 12 with the operating member 8 and a shorter arm 11b pivotally connected by a link 13 with a longer arm 14a of a second bell crank 14 which is pivotally mounted on the frame 1. A shorter arm 14b of the bell crank 14 is pivotally connected to a push-pull rod 15 of a conventional steering control system actuated by a pilot-controlled steering member such as rudder pedals, a rudder bar, or a steering wheel.

As will be seen, especially in FIG. 2A, the connection of the push-pull rod 15 to the shorter arm 14b of the bell crank 14 is by means of a lost-motion device consisting of a sleeve 15a which is pivotally connected at one end with arm 14b of the bell crank 14 and which receives an end portion of the push-pull rod 15 on the end of which there is a head or piston 15b, the outer end of the sleeve 15a being closed except for passage of the push-pull rod 15. It will be seen that this construction provides a certain amount of lost motion or play in the connection between the push-pull rod 15 and the bell crank 14 for a purpose that will be later explained.

It will be seen that by reason of the operating member 8 being connected by the link 12 with the longer arm 11a of the bell crank 11 of which a shorter arm 11b is connected by link 13 with the longer arm 14a of bell crank 14 of which a shorter arm 14b is pivotally connected with the push-pull rod 15 of the steering system, the amplitude of movement of the operating member 8 is greater than the amplitude of movement of the push-pull rod 15. Thus, the linkage mechanism provides motion amplification which is added to the motion amplification provided by the pinions 4 and 6 as described above.

Moreover, centrifugal force acting on the link 12 and the longer arm 11a of the bell crank 11 supplements the centrifugal force acting on the operating member 8, by reason of rotation of the rotor, to counterbalance centrifugal force acting on the tip brake member 2. The counterbalancing force is greater than the centrifugal force acting on the tip brake member 2 so that the tip brake member is biased to a retracted position.

When it is desired to fly straight ahead, with the rudder bar or other steering member in neutral or center position, the lost motion in the connections between the push-pull rods of the steering control system and the respective bell cranks 14 of both rotors makes it possible for the tip brakes of both rotors to be held in retracted position by the centrifugal force acting on the operating members 8, links 12 and longer arms 11a of the bell cranks 11 as described above and also makes it possible for the tip brakes of one rotor to be held in retracted position by centrifugal force when reverse travel of the push-pull rods by the rudder bar or steering wheel is In FIG. 3 there is shown a tip light 16 in an outer end portion of the frame 1.

What we claim is:

1. A tip brake unit for installation in a tip portion of a blade of rotary a rotor of a wing aircraft, said unit comprising:
    a frame of a size and shape for installation in a tip portion of a rotor blade;
    an elongate tip brake member of channel cross sectional shape having an inner end and an outer end with an end closure closing said outer end of said tip brake member;
    supporting and guiding means in said frame for supporting said tip brake member in a position extending longitudinally of a rotor blade in which said unit is installed and for guiding said tip brake member for movement in a longitudinal direction between an inner position in which said outer end of said tip brake member is flush with a tip of a rotor blade in which said unit is installed and an outer position in which said tip brake member extends outwardly beyond said tip of said blade; and
    operating means for moving said tip brake member between said inner position and said outer position, said operating means comprising gear teeth constituting a first rack on said tip brake member, a first pinion rotatably supported by said frame and meshing with said first rack, a second pinion coaxially rotatable with said first pinion, an elongate operating member having a second rack meshing with said second pinion and guided by said frame for movement in a longitudinal direction and connecting means for connecting said operating member with a tip brake control system of said aircraft for movement of said operating member longitudinally by said system and thereby moving said tip brake member between said inner position and said outer position.

2. A tip brake unit according to claim 1, in which said first pinion is of larger diameter than said second pinion.

3. A tip brake unit according to claim 1, in which said first rack is on an inner surface of said tip brake member of channel cross sectional shape.

4. A tip brake unit according to claim 1, in which said supporting and guiding means comprises rollers rotatably supported by said frame and engaging, supporting, and guiding said tip brake member.

5. A tip brake unit according to claim 3, in which said tip brake member has plane surfaces on opposite sides of said first rack and in which said supporting and guiding means comprises rollers rotatably supported by said frame and engaging said plane surfaces.

6. A tip brake unit according to claim 1, in which centrifugal force acting on said operating means by reason of rotation of said rotor counterbalances centrifugal force acting on said tip brake member.

7. A tip brake unit according to claim 6, in which said centrifugal force acting on said operating means is greater than said centrifugal force acting on said tip brake member.

8. A tip brake unit according to claim 7, in which said means for connecting said operating member with said tip brake control system of said aircraft comprises a lost motion device permitting limited relative movement between said operating member and said tip brake control system of said aircraft.

9. A tip brake unit according to claim 1, in which said connecting means comprises a first member connected with said operating member, a second member connected with said tip brake control system of said aircraft and motion amplifying means connecting said second member with said first member for imparting to said first member a movement of greater amplitude than movement of said second member.

10. A tip brake unit according to claim 9, in which said motion amplifying means comprises a bell crank pivotally supported by said frame and having a longer arm and a shorter arm, means for connecting said longer arm with said operating member and means for connecting said shorter arm with said tip brake control system of said aircraft.

11. A tip brake unit according to claim 9, in which said motion amplifying means comprises a first bell crank pivotally supported by said frame and having a longer arm and a shorter arm, a second bell crank pivotally supported by said frame and having a longer arm and a shorter arm, means for connecting said longer arm of said first bell crank with said operating member, means for connecting said shorter arm of said first bell crank with said longer arm of said second bell crank and means for connecting said shorter arm of said second bell crank with said tip brake control system of said aircraft.

12. A tip brake unit according to claim 11, in which said means for connecting said shorter arm of said second bell crank with said tip brake control systems of said aircraft comprises a lost motion device permitting limited relative movement between said shorter arm of said second bell crank and said tip brake control system of said aircraft.

13. A tip brake unit according to claim 1, in which said tip brake member of channel cross sectional shape has an open side which faces forwardly with respect to the direction of movement of the tip portion of the rotor blade in which said tip brake unit is installed.

* * * * *